(12) United States Patent
Kennedy

(10) Patent No.: US 10,507,701 B2
(45) Date of Patent: Dec. 17, 2019

(54) QUICK RELEASE TOW HITCH AND METHOD OF USING THE TOW HITCH

(71) Applicant: Kennco Investments, LLC

(72) Inventor: Russell R. Kennedy, Hot Springs, AR (US)

(73) Assignee: Kennco Investments, LLC, Hot Springs, AR (US)

( * ) Notice: Subject to any disclaimer, the term of this patent is extended or adjusted under 35 U.S.C. 154(b) by 110 days.

(21) Appl. No.: 15/842,947

(22) Filed: Dec. 15, 2017

(65) Prior Publication Data

US 2019/0184780 A1  Jun. 20, 2019

(51) Int. Cl.
*B60D 1/06* (2006.01)
*B60D 1/40* (2006.01)
*B60D 1/44* (2006.01)
*B60D 1/155* (2006.01)
*B60D 1/54* (2006.01)
*B60D 1/07* (2006.01)

(52) U.S. Cl.
CPC ............ *B60D 1/065* (2013.01); *B60D 1/075* (2013.01); *B60D 1/155* (2013.01); *B60D 1/54* (2013.01)

(58) Field of Classification Search
CPC . B60D 1/40; B60D 1/44; B60D 1/155; B60D 1/06; B60D 1/36
USPC ...................... 280/482, 478, 1, 511, 506, 507
See application file for complete search history.

(56) References Cited

U.S. PATENT DOCUMENTS

| | | | | |
|---|---|---|---|---|
| 2,894,766 A | * | 7/1959 | Habriga | B60D 1/155 280/482 |
| 3,032,353 A | * | 5/1962 | Williams | B60P 3/1083 280/414.1 |
| 3,292,950 A | * | 12/1966 | Kirkpatrick | A01B 59/04 280/482 |
| 3,837,679 A | * | 9/1974 | Dickmann | B60D 1/52 172/275 |
| 4,169,611 A | * | 10/1979 | Smith | B60D 1/155 280/482 |
| 4,466,632 A | | 8/1984 | DeVorak | |

(Continued)

OTHER PUBLICATIONS

Hitrific, www.hitchrific.com, pp. 1-8, 2017.

*Primary Examiner* — Anne Marie M Boehler
(74) *Attorney, Agent, or Firm* — Jeffrey S. Melcher; Melcher Patent Law PLLC

(57) ABSTRACT

Provided is a trailer platform having an adjustable ball position. The platform has a first end portion sized to removably mount within a trailer hitch receiver and a second end portion opposite the first end portion. A movable ball mount having a ball hole sized to mount a trailer ball is on the movable ball mount and the movable ball mount is movably mounted on the second end portion of the platform so that the movable ball mount can be moved between a retracted position and an extended position on the platform to adjust a distance between the first end of the platform the ball hole, with the extended position providing a greater distance between the ball hole and the first end portion than the distance between the ball hole and the first end portion in the retracted position. Also provided is a method of using the movable ball mount to provide slack to disconnect a trailer coupler from the trailer ball. Also provided is a method of using the movable ball mount to locate the trailer ball under a trailer coupler to connect a trailer coupler to the trailer ball.

12 Claims, 6 Drawing Sheets

(56) References Cited

U.S. PATENT DOCUMENTS

| | | | | |
|---|---|---|---|---|
| 5,011,177 A * | 4/1991 | Grice | ............... | B60D 1/40 |
| | | | | 280/482 |
| 5,147,096 A * | 9/1992 | Rogers | ............... | B60D 1/60 |
| | | | | 280/507 |
| 7,156,411 B2 * | 1/2007 | Jaekel | ............... | B60D 1/485 |
| | | | | 280/479.1 |
| 8,474,852 B1 * | 7/2013 | Granados | ............... | B60D 1/36 |
| | | | | 280/478.1 |
| 9,981,516 B1 * | 5/2018 | Alvarez | ............... | B60D 1/54 |

\* cited by examiner

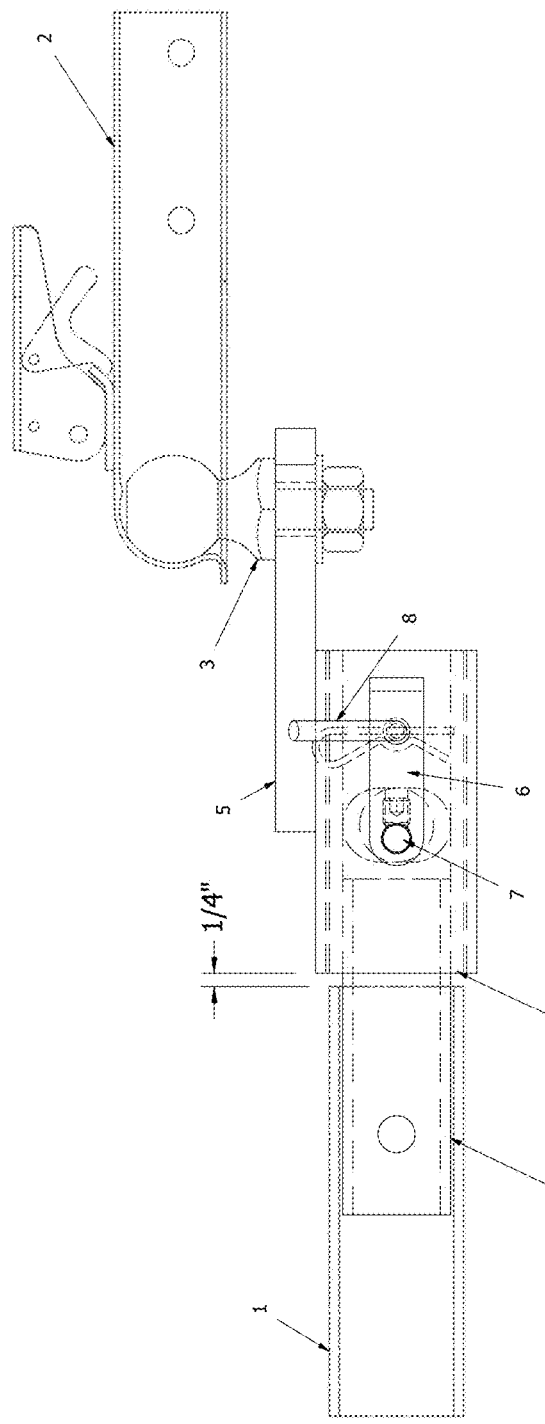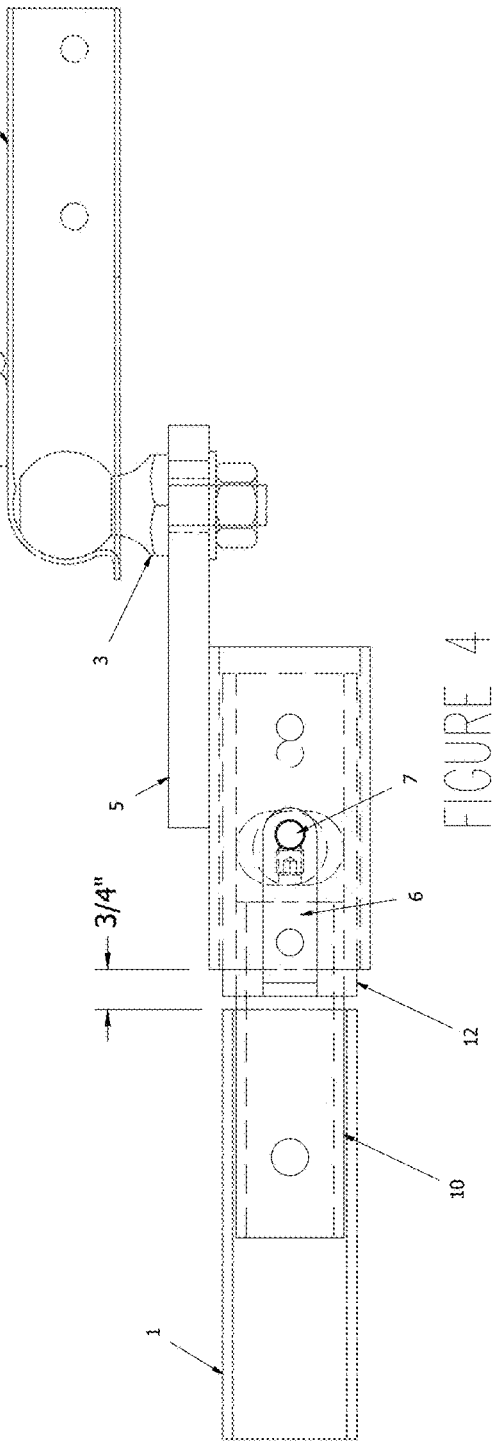

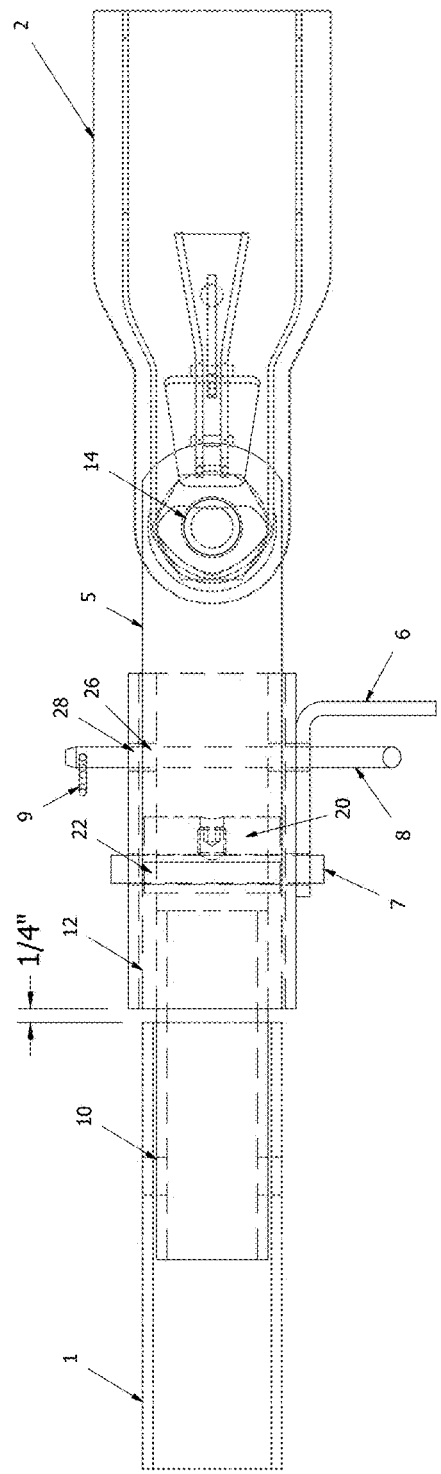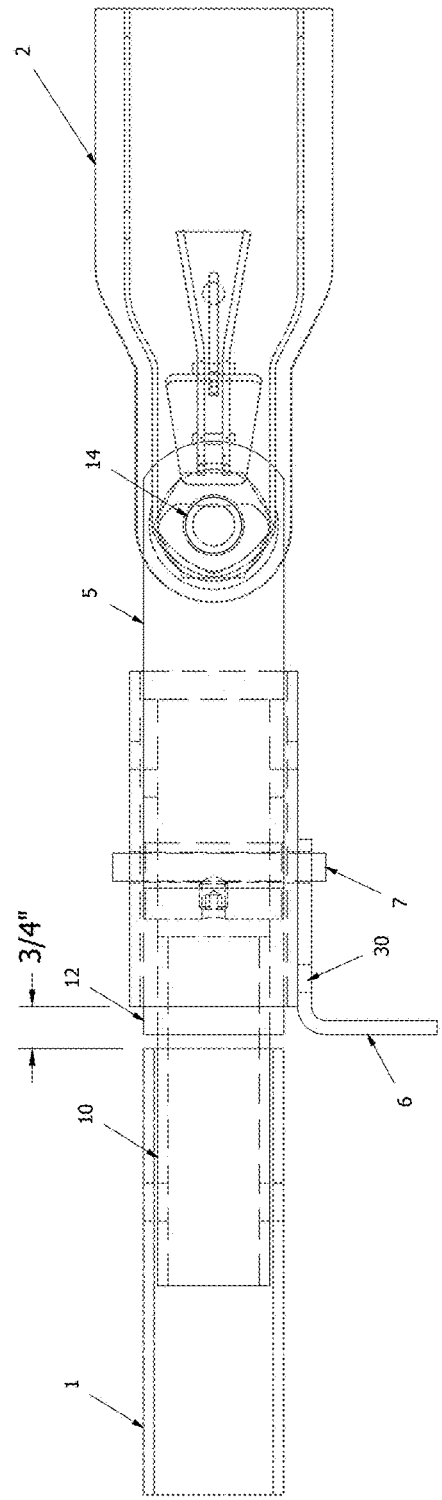

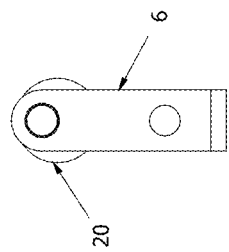
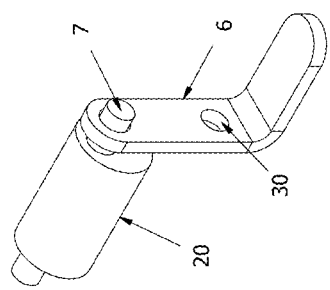
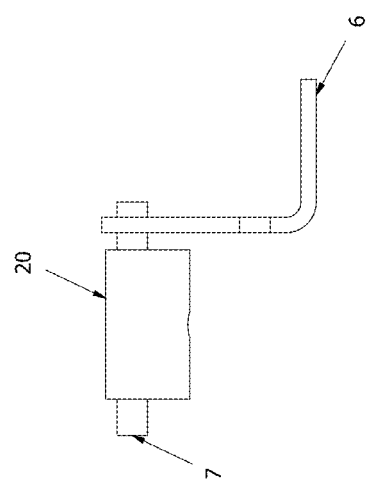
FIGURE 7A
FIGURE 7B
FIGURE 7C

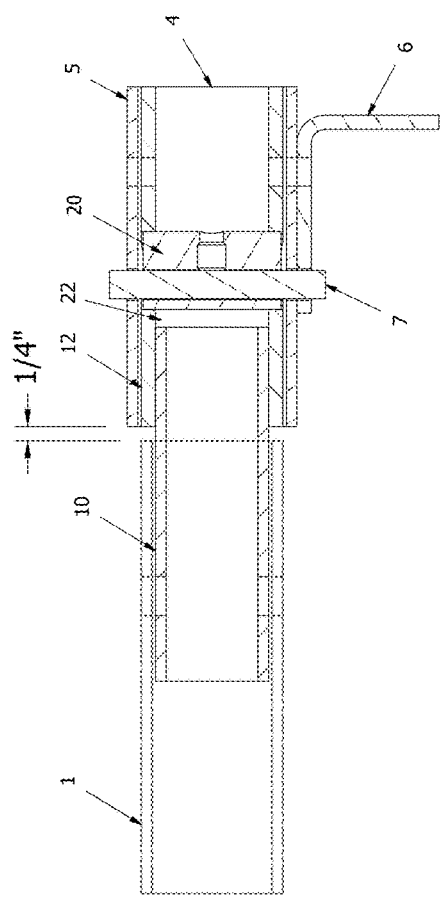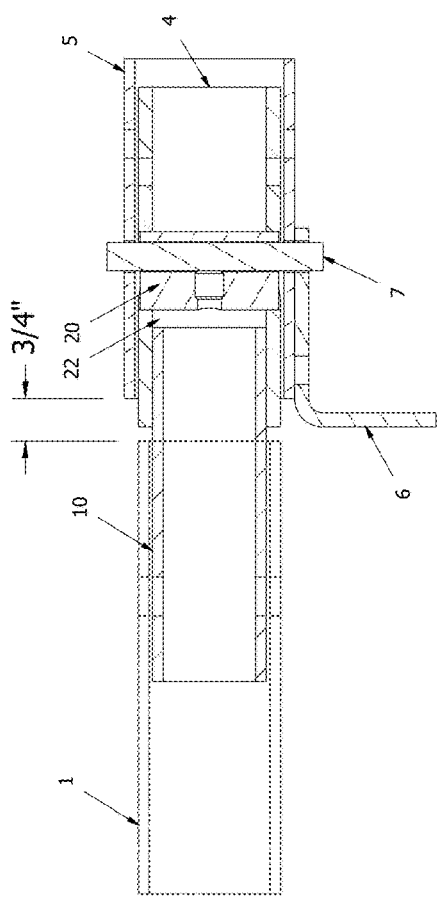

QUICK RELEASE TOW HITCH AND METHOD OF USING THE TOW HITCH

FIELD OF THE INVENTION

The invention relates to a quick release tow hitch and a method of using the tow hitch, in which the location of the trailer ball is adjustable.

BACKGROUND OF THE INVENTION

When towing a vehicle behind a motorhome, there is often a great difficulty in removing the tow bar coupler from the trailer ball on the motorhome hitch. There is usually no jack on the tow bar to be able to jack the coupler up and off of the ball. The towed vehicle almost always stops with a lot of tension on the ball from the trailer coupler, especially in up-hill or gravel situations. The added tension can also make it difficult to remove the receiver pin to provide additional slack. Often, two people are required, one to drive the vehicle and make slow motions back and forth, and the other one at the hitch coupler jerking the tow bar coupler upward rapidly. Towing other types of trailers, vehicles, boats, etc. often exhibit the same problem.

SUMMARY OF THE INVENTION

An objective of the invention is to provide an improved trailer platform that can provide an adjustable trailer ball position for easier removal and installation of a trailer coupler to a trailer ball.

The above objectives and other objectives can be obtained by a trailer platform having an adjustable ball position comprising:
 a platform having a first end portion sized to removably mount within a trailer hitch receiver and a second end portion opposite the first end portion; and
 a movable ball mount having a ball hole sized to mount a trailer ball on the movable ball mount, the movable ball mount being movably mounted on the second end portion of the platform so that the movable ball mount can be moved between a retracted position and an extended position on the platform to adjust a distance between the first end of the platform the ball hole, with the extended position providing a greater distance between the ball hole and the first end portion than the distance between the ball hole and the first end portion in the retracted position.

The above objectives and other objectives can be obtained by a method of using the trailer platform comprising moving the movable ball mount to an extended position to provide slack and removing a trailer coupler from the trailer ball to disconnect the trailer coupler from the trailer ball.

The above objectives and other objectives can further be obtained by a method of using the trailer platform comprising moving the movable ball mount to an extended or retracted position to locate the trailer ball under a trailer coupler and lowering the trailer coupler onto the trailer ball to connect the trailer coupler to the trailer ball.

BRIEF DESCRIPTION OF THE DRAWINGS

FIG. 3 illustrates a side view of the hitch in a retracted position.

FIG. 4 illustrates a side view of hitch in an extended position.

FIG. 5 illustrates a plan view of the hitch in a retracted position.

FIG. 6 illustrates a plan view of the hitch in an extended position.

FIGS. 7A, 7B and 7C illustrate different views of the cam.

FIG. 8 illustrates a top view of the platform in a retracted position.

FIG. 9 illustrates a top view of the platform in an extended position.

DETAILED DESCRIPTION OF THE INVENTION

Figure 1:
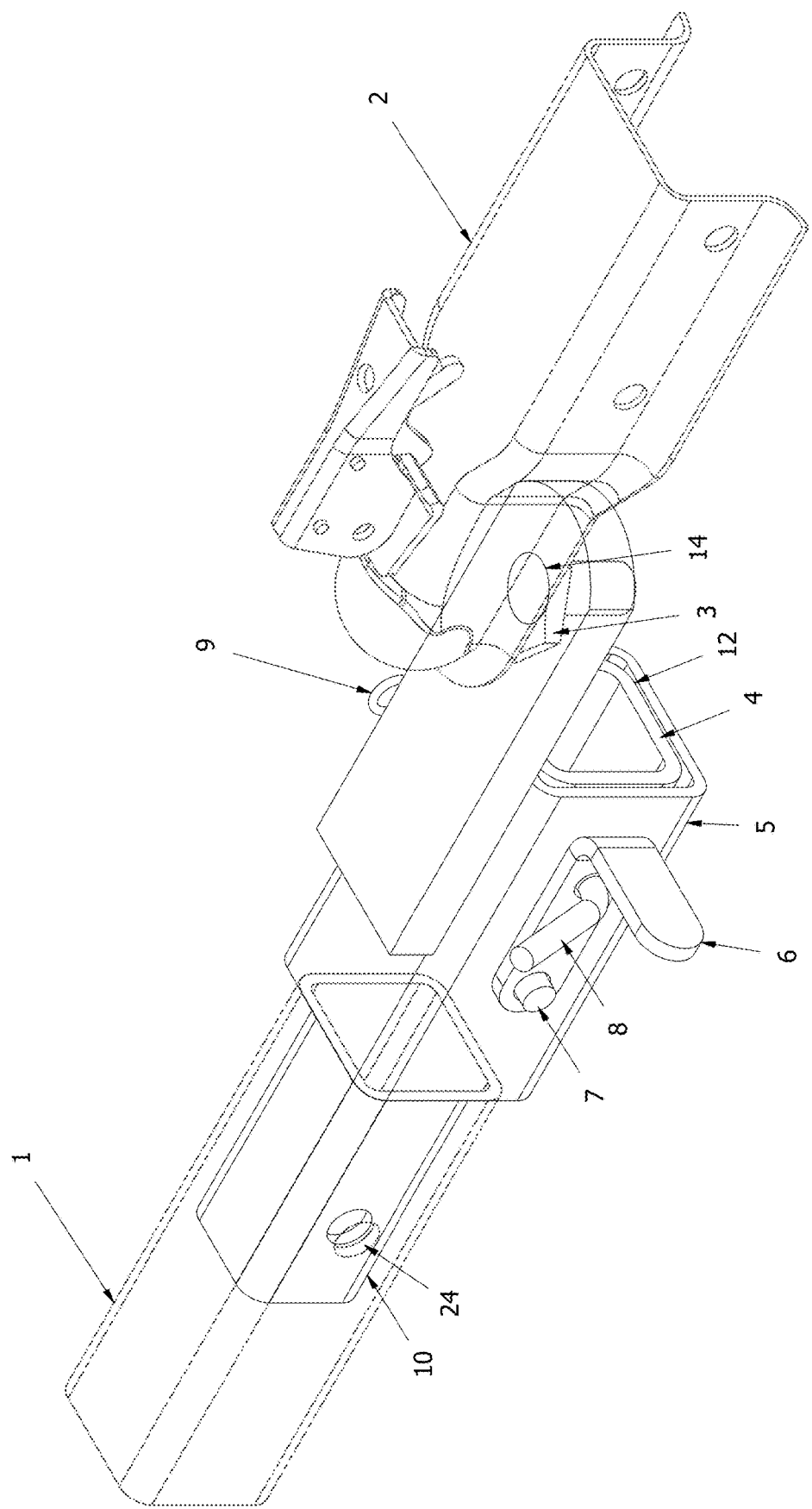
FIG. 1 illustrates an isometric view of the hitch in a retracted position.
Figure 2:
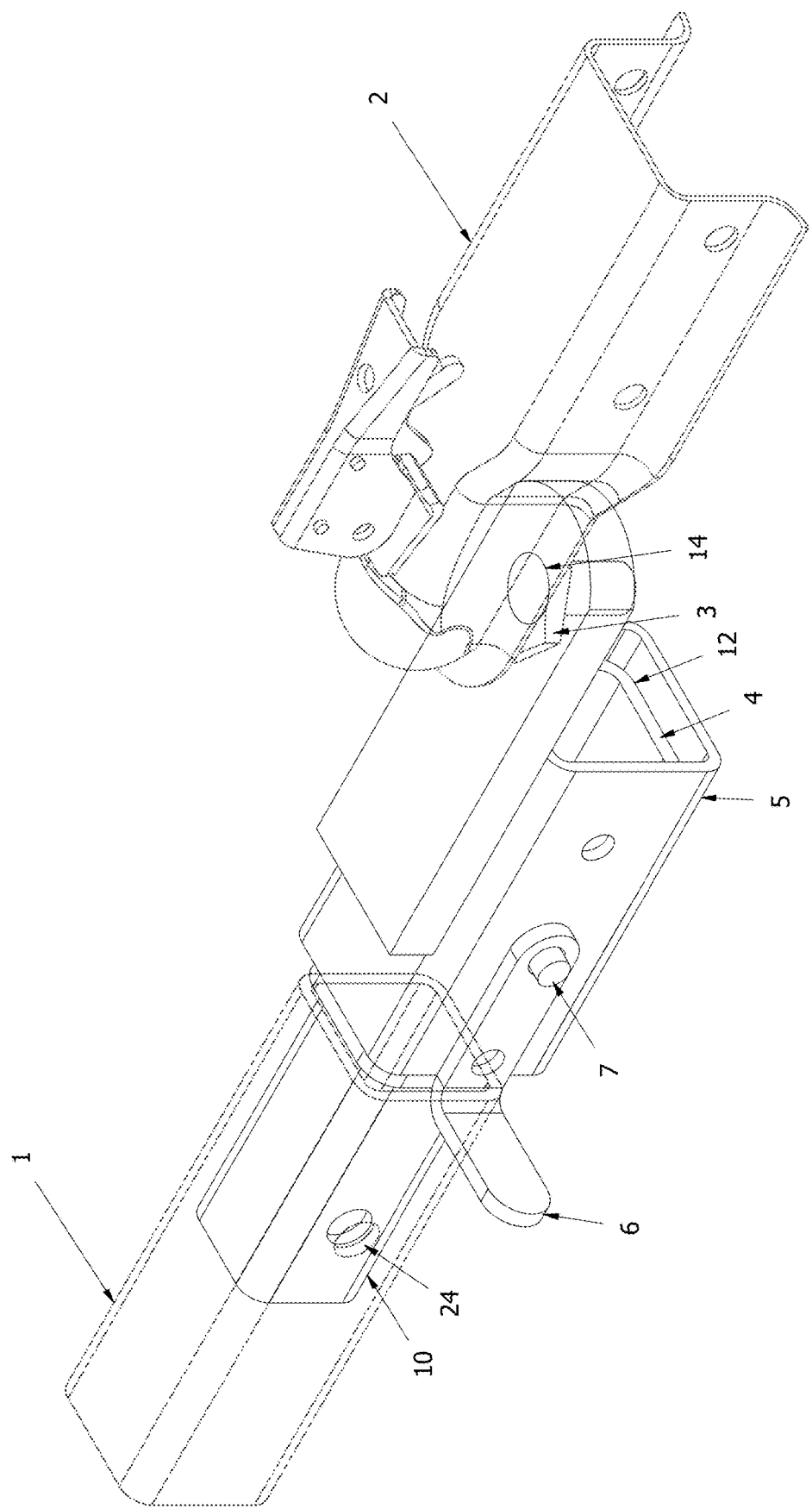
FIG. 2 illustrates an isometric view of the hitch in an extended position.

The invention will now be explained with reference to the attached non-limiting FIGS. 1-9.

The receiver 1 of a trailer hitch is usually mounted on a vehicle for towing. The receiver 1 usually has a square opening sized and shaped to receive a first end portion of a removable platform. The receiver usually has a receiver locking hole 24 so that conventional platforms can be locked within the receiver 1 using a pin 8 and clip 9 (shown in different hole), or lock (not shown) that fits through the receiver locking hole 24. The present trailer platform 4 also has a first end portion 10 that inserts into the receiver 1 and can be fastened in place within the receiver using a pin 8 and clip 9, or lock (not shown) that fits through a locking hole in a first end portion of the platform 5. Any conventional receiver 1 and platform 4 size and shape can be utilized. The most common conventional shape is square and sizes are 1¼×1¼ or 2×2 inches. Any conventional size coupler 2 and trailer ball 3 can be utilized, for example, 1⅞, 2, or 2 5/16 inch diameter are the most common.

In the prior art, the ball 3 is usually connected directly to a prior art platform so that when the prior art platform is fastened within the receiver 1, the trailer ball 3 cannot be moved in relation to the first end portion of the platform. In the prior art, a trailer ball 3 is mounted on the platform using a ball hole in the platform. A trailer coupler 2 and ball 3 are sized so that the coupler 2 fits over the ball 3 and can be fastened to the ball 3. When using prior art platforms, the ball 3 location in relation to trailer coupler 2 can only be adjusted by moving the vehicle and/or coupler 2, which is difficult and often requires another person to provide steering directions to the vehicle driver to properly align the coupler 2 with the ball 3.

In the present invention, the trailer ball 3 can be moved in relation to the first end portion 10 of the trailer platform 4 so that vehicle and coupler 2 do not have to be moved in relation to each other in order to provide slack or line up coupler 2 with the trailer ball 3. As shown in the FIGS. 1-9, a movable ball mount 5 has a ball hole 14 sized to mount a trailer ball 3 on the movable ball mount 5. The movable ball mount 5 is movably mounted on a second end portion 12 of the adjustable platform 4 so that the movable ball mount 5 can moved between a retracted position shown in FIGS. 1, 3, 5 and 8, and an extended position shown in FIGS. 2, 4, 6 and 9, on the platform 4 to adjust a position between the first end portion 10 of the platform 4 and the ball hole 14, with the extended position providing a greater distance between the ball hole 14 and the first end portion 10 than the distance between the ball hole 14 and the first end portion 10 in the retracted position. The platform 4 and movable ball mount 5 can be constructed to provide any desired travel distance between the first end portion 10 and ball hole 14, wherein preferably at least 1 inch, and more preferably at least 0.5 inch of travel distance is provided.

A moveable ball mount lock can be used to lock the moveable ball mount 5 to a second end portion 12 of the platform 4. An example of the moveable ball mount lock is the locking pin 8 inserted in a first hole 26 on the adjustable platform 4 and a second hole 28 on the moveable ball mount 5. The locking pin 8 can be locked in place using a clip 9. Any other desired lock can be used in place of the locking pin 8 and clip 9. Preferably, the first hole 26 and the second hole 28 are larger than the receiver locking hole 24 so that standard sizes pins 8 and locks for locking the platform 4 to the receiver 1 can also be used to lock the movable ball mount 5 in place on the platform 4, and also include slack so that the pin 8 can easily be removed from the first hole 26 and second hole 28.

The movable ball mount 5 can further comprise a moving mechanism constructed to move the movable ball mount 5 between the retracted position and the extended position. An exemplary moving mechanism is shown in the Figs. comprising a cam 7 having an off-center lobe 20 that fits within a depression 22 of the adjustable platform 4 so that when the cam 7 is rotated by a cam lever 6 the cam 7 rotates the lobe 20 within the depression 22 to move the movable ball mount 5 between the retracted position and the extended position. The cam 7 can be locked by inserting a locking pin 8 through a first hole 26 in the platform 4, a second hole 28 in moveable ball mount 5 and a third hole 30 in the cam lever 6 as shown in FIG. 5. The locking pin 8 can be locked in place using a clip 9. The invention is not limited to this exemplary moving mechanism, and can utilize any other type moving mechanism, such as screws, levers, bolts, actuators, holes, or any other.

I have found that if slack is provided in the trailer ball 3 location in relation to the coupler 2 by moving the moveable ball mount 5 to an extended position, such as about 0.5 inch of travel distance to provide slack, the coupler 2 can be more easily removed from trailer ball 3 than if no slack is provided. The moveable ball mount 5 can also be used when mounting the coupler 2 on the trailer ball 3. If the coupler 2 is a distance from trailer ball 3 that is equal to or less than the travel distance of the moveable ball mount 5, the movable ball mount 5 can be extended to locate the trailer ball 3 under the coupler 2.

The invention also relates a method of using the platform 4 to remove a coupler 2 from a trailer ball 3. The method comprises moving the lever 6 to rotate the cam 7 to extend the movable ball mount 5 to an extended position to provide slack, and then removing the coupler 2 from the trailer ball 3.

The invention also relates a method of using the platform 4 to attach a coupler 2 to a trailer ball 3. The method comprises moving the lever 6 to rotate the cam 7 to extend or retract the movable ball mount 5 to locate the trailer ball 3 under the coupler 2, and then attaching the coupler 2 to the trailer ball 3.

It should be understood, of course, that the foregoing relates to exemplary embodiments of the invention and that modifications may be made without departing from the spirit and scope of the invention as set forth in the following claims. For example, the platform can include a drop down to reduce the height of the ball.

The invention claimed is:

1. A trailer platform having an adjustable ball position comprising:
    a platform having a first end portion sized to removably mount within a trailer hitch receiver and a second end portion opposite the first end portion;
    a movable ball mount having a ball hole sized to mount a trailer ball on the movable ball mount, the movable ball mount being movably mounted on the second end portion of the platform so that the movable ball mount can be moved between a retracted position and an extended position on the platform to adjust a distance between the first end of the platform and the ball hole, with the extended position providing a greater distance between the ball hole and the first end portion than the distance between the ball hole and the first end portion in the retracted position; and
    a cam constructed to move the movable ball mount between the extended position and the retracted position, the cam having an off-center lobe that fits within a depression of the platform, and the cam can be rotated to rotate the lobe within the depression to move the movable ball mount between the retracted position and the extended position.

2. The trailer platform according to claim 1, wherein the movable ball mount comprises a sleeve that mounts over and around the second end portion of the platform, the sleeve being able to slide in relation the second end portion.

3. The trailer platform according to claim 1, further comprising a lock for locking the movable ball mount in a desired position on the second end portion.

4. The trailer platform according to claim 1, further comprising a cam lever connected to the cam for rotating the cam.

5. The trailer platform according to claim 1, further comprising a lock for locking the movable ball mount in a desired position on the platform.

6. The trailer platform according to claim 1, further comprising a lock for locking the movable ball mount in the retracted position on the platform.

7. The trailer platform according to claim 1, further comprising a lock for locking the movable ball mount in the retracted position on the platform, the lock comprising a first locking hole in the platform, a second locking hole in the movable ball mount, a pin sized to fit in the first and second locking holes, and a clip for locking the pin in place, and the first and second holes lining up when the movable ball mount is in the retracted position.

8. The trailer platform according to claim 4, further comprising a cam lever lock for locking the cam lever when the movable ball mount is in a retracted position.

9. A trailer platform having an adjustable ball position comprising:
    a platform having a first end portion sized to removably mount within a trailer hitch receiver and a second end portion opposite the first end portion;
    a movable ball mount having a ball hole sized to mount a trailer ball on the movable ball mount, the movable ball mount being movably mounted on the second end portion of the platform so that the movable ball mount can be moved between a retracted position and an extended position on the platform to adjust a distance between the first end of the platform and the ball hole, with the extended position providing a greater distance between the ball hole and the first end portion than the distance between the ball hole and the first end portion in the retracted position;
    a cam constructed to move the movable ball mount between the extended position and the retracted position;

a cam lever connected to the cam for moving the cam; and a lock for locking the movable ball mount in the retracted position on the platform, the lock comprising a first locking hole in the platform, a second locking hole in the movable ball mount, a third locking hole in the cam lever, a pin sized to fit in the first, second and third locking holes, and a clip for locking the pin in place, the first, second and third holes lining up when the movable mount is in the retracted position.

10. A method of moving a trailer ball mounted on a vehicle in relation to a trailer coupler mounted on a trailer, the method comprising:

providing a platform having a first end portion sized to removably mount within a trailer hitch receiver on the vehicle and a second end portion opposite the first end portion; a movable ball mount having a ball hole sized to mount the trailer ball on the movable ball mount, the movable ball mount being movably mounted on the second end portion of the platform so that the movable ball mount can be moved between a retracted position and an extended position on the platform to adjust a distance between the first end of the platform and the ball hole, with the extended position providing a greater distance between the ball hole and the first end portion than the distance between the ball hole and the first end portion in the retracted position; and a cam constructed to move the movable ball mount between the extended position and the retracted position, the cam having an off-center lobe that fits within a depression of the platform, and the cam can be rotated to rotate the lobe within the depression to move the movable ball mount between the retracted position and the extended position; and rotating the cam to move the movable ball mount in relation to the trailer coupler.

11. A method of claim 10, wherein the cam is rotated to move the movable ball mount to an extended or retracted position to locate the trailer ball under the trailer coupler and lowering the trailer coupler onto the trailer ball to connect the trailer coupler to the trailer ball.

12. The method of claim 10, the cam is rotated to move the movable ball mount to an extended position to provide slack and removing the trailer coupler from the trailer ball to disconnect the trailer coupler from the trailer ball.

\* \* \* \* \*